(12) United States Patent
Brotto

(10) Patent No.: US 7,102,303 B2
(45) Date of Patent: Sep. 5, 2006

(54) GENERIC MOTOR CONTROL SYSTEM AND METHOD

(75) Inventor: Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 272 days.

(21) Appl. No.: 10/426,589

(22) Filed: Apr. 30, 2003

(65) Prior Publication Data

US 2004/0217721 A1    Nov. 4, 2004

(51) Int. Cl.
*H02P 1/54* (2006.01)
*H02P 3/00* (2006.01)
*H02P 5/00* (2006.01)
*H02P 5/46* (2006.01)

(52) U.S. Cl. .................. 318/53; 318/806; 318/34; 318/255; 388/937

(58) Field of Classification Search .......... 318/34–113, 318/255–300, 806; 388/937
See application file for complete search history.

(56) References Cited

U.S. PATENT DOCUMENTS

| | | | |
|---|---|---|---|
| 4,028,599 A | 6/1977 | Zankl et al. | |
| 4,307,325 A * | 12/1981 | Saar | 388/809 |
| 4,550,277 A * | 10/1985 | Carney | 388/809 |
| 4,577,269 A | 3/1986 | Abbondanti | |
| 4,628,233 A | 12/1986 | Bradus | |
| 4,673,850 A | 6/1987 | Maudlin | |
| 4,689,534 A * | 8/1987 | Gerber et al. | 388/809 |
| RE33,379 E | 10/1990 | Bradus | |
| 5,079,410 A | 1/1992 | Payne et al. | |
| 5,170,851 A | 12/1992 | Kress et al. | |
| 5,486,747 A | 1/1996 | Welch | |
| 5,978,547 A * | 11/1999 | Reynolds et al. | 388/811 |
| 5,986,417 A | 11/1999 | Nicolai et al. | |
| 6,194,856 B1 | 2/2001 | Kobayashi | |
| 6,232,734 B1 | 5/2001 | Anzai | |
| 6,320,286 B1 | 11/2001 | Ramarathnam | |
| 6,329,778 B1 | 12/2001 | Culp et al. | |
| 6,390,205 B1 | 5/2002 | Wallgren et al. | |
| 6,462,494 B1 | 10/2002 | Schone et al. | |
| 7,007,762 B1 | 3/2006 | Yamamoto | |
| 2002/0134811 A1 | 9/2002 | Napier et al. | |
| 2002/0190687 A1 | 12/2002 | Bell et al. | |

(Continued)

FOREIGN PATENT DOCUMENTS

EP    0 496 549 B1    1/1992

(Continued)

OTHER PUBLICATIONS

"Single-Chip 8-Bit CMOS Microcomputer," Dec. 26, 1997, Mitsubishi Microcomputers 3802 Group, Mitsubishi Electric, Rev. 1.0, p. 9.*

Primary Examiner—Rina Duda
Assistant Examiner—Erick Glass
(74) Attorney, Agent, or Firm—Harness, Dickey & Pierce, P.L.C.

(57) ABSTRACT

A method for controlling the operation of a motor utilizing a universal motor control module. The method includes sampling at least one motor operating criterion during operation of the motor and executing a universal control algorithm at a predetermined periodic interval of an AC line signal. Execution of the algorithm provides a firing angle solution for an electronic valve for each periodic interval, thereby controlling the behavior of the motor. Additionally, the method includes firing the electronic valve at the calculated firing angle during each periodic interval such that the motor functions in accordance with desired operational parameters.

32 Claims, 2 Drawing Sheets

U.S. PATENT DOCUMENTS

2004/0085193 A1* 5/2004 Crowell .................. 340/310.01

FOREIGN PATENT DOCUMENTS

| | | |
|---|---|---|
| EP | 0 684 692 A2 | 5/1995 |
| EP | 0 741 450 B1 | 4/1996 |
| GB | 2 058 405 A | 8/1980 |
| WO | WO 03/007467 | 1/2003 |

* cited by examiner

GENERIC MOTOR CONTROL SYSTEM AND METHOD

FIELD OF INVENTION

The invention relates generally to systems and methods for controlling the operation of a motor. More specifically, the invention relates to a universal motor control module suitable for use with any of a variety of motors in any of a variety of motor applications.

BACKGROUND OF THE INVENTION

Typically, motors are controlled by dedicated analog or digital circuitry configured to control a specific motor in a specific application. For example, one dedicated circuit would be required to control a specific motor utilized in a power saw application, while another dedicated circuit would be required to control a different motor utilized in a drill application. Or further yet, one dedicated circuit would be required to control the motor utilized in the power saw application, while a different circuit would be required to utilize the same motor in a table saw application. Normally, each dedicated analog or digital control circuit would be constructed of different components. These components would typically have differing values and/or control software in order to create a unique operational characteristic profile for each motor and each specific motor application.

The requirement of different dedicated control circuitry for different motors and different applications greatly increases manufacturing, engineering design, parts, inventory and labor costs. This is because, up until the present time, no one 'universal' motor control circuit or module was available that could be easily tailored to meet the operational needs of different types of applications (e.g. drills, saws, grinders, etc.). Thus, there has existed a need for a single control circuit or module that can easily be tailored to control and optimize performance of a given one of a plurality of differing motors in a given one of a plurality of differing motor applications that require different operational characteristics.

BRIEF SUMMARY OF THE INVENTION

In one preferred embodiment of the present invention a method is provided for controlling the operation of a motor utilizing a universal motor control module. The method includes sampling at least one motor operating criterion (i.e. one dynamic pertinent motor input) during operation of the motor and executing a control algorithm at a predetermined periodic interval of an AC line signal. Execution of the algorithm provides a firing angle solution for an electronic valve for each periodic interval, thereby controlling the operational behavior of the motor. Additionally, the method includes firing the electronic valve at the calculated firing angle during each periodic interval such that the motor functions in accordance with desired operational parameters.

In another preferred embodiment, a universal motor control module is provided. The universal motor control module includes a memory device for storing a hard coded control algorithm. A microprocessor is included for executing the control algorithm to determine a firing angle solution for an electronic valve at a predetermined periodic interval of an AC line signal. The universal motor control module additionally includes an alterable memory device for storing at least one soft coded function coefficient used during execution of the control algorithm. The soft coded function coefficient is specific to a particular motor application such that the control module is suitable for controlling the operation of any one of a plurality of motors in any one of a plurality of motor applications (e.g. different power tools).

BRIEF DESCRIPTION OF THE DRAWINGS

The present invention will become more fully understood from the detailed description and accompanying drawings, wherein.

DETAILED DESCRIPTION OF THE INVENTION

Figure 1:
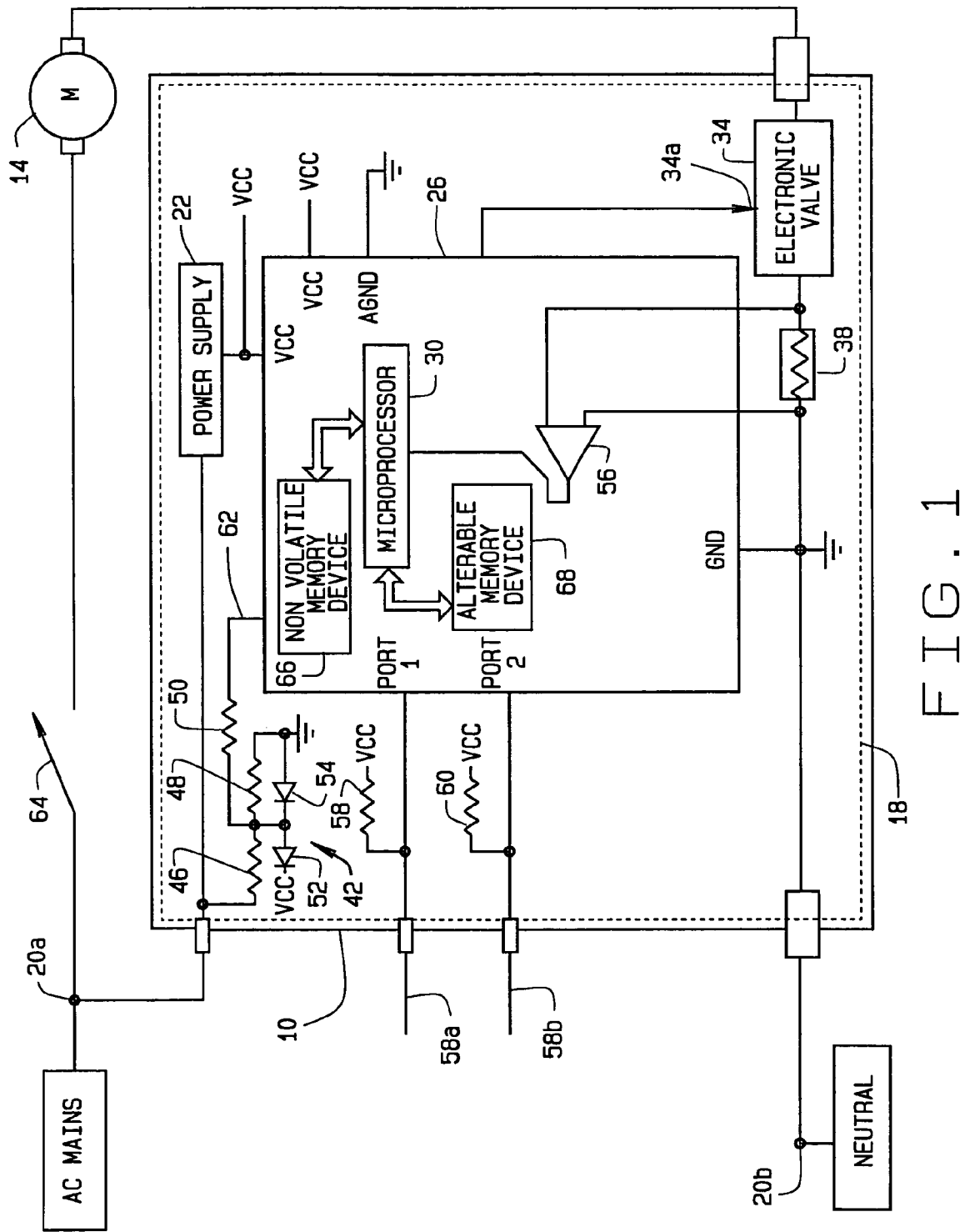
FIG. 1 is a simplified circuit diagram of a universal motor control module, in accordance with one preferred embodiment of the present invention.

FIG. 1 is a simplified circuit diagram of a universal motor control module 10, in accordance with one preferred embodiment of the present invention. The universal motor control module 10 is connectable to an AC motor 14 that can be any one of a plurality of motors used in any one of a plurality of applications. The universal motor control module 10 is capable of controlling any of the plurality of motors, such as motor 14, in any of the plurality of motor applications. Additionally, the universal motor control module 10 includes a digital control circuit, generally indicated at 18. Therefore, the universal motor control module 10 is a digital control module that can be used to control any of the plurality of motors, in any of the plurality of applications, without altering components, component values, and/or control software to create an application specific control or control behavior.

For example, the universal module 10 can be used to control the motor of a heavy duty half-inch drill that has a high gear ratio and generates a high degree of torque, or to control the motor of a quarter-inch drill that has a relatively low gear ratio and generates only a small degree of torque. Similarly, the universal motor control module 10 can be utilized to control a motor used in a plurality of applications. For example, if a specific model of motor were used in both a power saw application and a drill press application, each with different operational parameters, the universal motor control module can be used to control the motor in both the power saw and the drill press without the need to change any electrical components, component values, or to alter control software associated with the module 10.

The universal motor control module 10 is further connectable to an AC power source, via the power cord (not shown), at an AC mains node 20a and a neutral node 20b. The control circuit 18 of the universal motor control module 10 includes a power supply 22 that supplies power to a microcontroller 26. The microcontroller 26 includes a microprocessor 30 programmed to control an electronic valve 34, such as a triac, a field effect transistor (FET), an insulated gate bipolar transistor (IGBT), a silicone-controlled rectifier (SCR), or various voltage control devices. The microcontroller 26 can be any suitable microcontroller. One microcontroller especially well suited for use with control circuit 18 is an AT26 microcontroller commercially available from ATMEL, Inc. of San Jose, Calif. To control operation of the motor 14, the microcontroller 26 controls the amount of voltage applied to the motor 14 by controlling the operation of the electronic valve 34.

The control circuit 18 further includes a shunt resistor 38 and a voltage divider circuit 42 comprised of resistors 46, 48, 50 and clamping diodes 52 and 54. The microcontroller 26 includes an amplifier 56 used to amplify the voltage across the shunt resistor 38 used by the microcontroller 26 to measure the current flowing through the electronic valve 34 and the motor 14. The voltage divider circuit 42 is coupled via a circuit line 62 to the microcontroller 26. The resistors 46, 48 and 50 divide the AC source voltage to a voltage level usable by the microcontroller 26, and the clamping diodes 52 and 54 protect the microcontroller 26 from damage if a voltage spike occurs in the AC source voltage. The microcontroller 26 senses an AC zero crossing by measuring the divided voltage from the AC power source via the voltage divider circuit 42. Alternatively, the microcontroller 26 can sense an AC zero crossing by monitoring a digital signal provided by a subsystem, wherein the digital signal would represent a zero crossing of the AC voltage. The control circuit 18 also includes a pair of pull up resistors 58 and 60 used to condition the voltage input at a 'port 1' and a 'port 2' of the microcontroller 26.

Generally, the universal motor control module 10 controls the operation of the motor 14 by switching the motor current on and off at periodic intervals in relation to the zero crossing of the AC current or voltage waveform, via the microcontroller 26 and control signals applied to a control input 34a of the electronic valve 34. These periodic intervals are caused to occur in synchronism with the AC waveform and are measured in terms of a conduction angle, measured as a number of degrees. The conduction angle determines the point within the AC waveform at which the electronic valve 34 is fired, thereby delivering electrical energy to the motor 14. For example, a conduction angle of 180° per half cycle corresponds to a condition of full conduction, in which electronic valve 34 is fired such that the entire, uninterrupted alternating current is applied to the motor 14. That is, the electronic valve 34 is fired such that current flows through the electronic valve 34 for the entire half cycle of the AC input signal. Similarly, a 90° conduction angle corresponds to developing the supply voltage across the motor 14 commencing in the middle of a given half cycle, and thus the electronic valve 34 is fired so that approximately half of the available energy is delivered to the motor. Conduction angles below 90° correspond to firing of the electronic valve 34 later in a given half cycle so that even lesser quantities of energy are delivered to the motor 14. Since the conduction angle determines the point at which the electronic valve 34 is fired, the conduction angle will also be referred to herein as the firing angle of the electronic valve 34.

The universal motor control module 10 controls the operation of the motor 14 when a motor control switch 64, e.g. a tool On/Off switch, is placed in a closed (i.e. 'On') position, thereby allowing current to flow through the motor 14. In one preferred embodiment, the control circuit 18 determines a firing angle solution for the electronic valve 34 for each half cycle of the AC line voltage. Alternatively, the control circuit 18 could determine the firing angle solution for each full cycle, each one and a half cycle, each two cycles, or any other predetermined periodic interval of the AC line voltage signal based on multiples of the half cycle. To determine the firing angle solution for each half cycle such that the motor 14 will operate in a desired manner, various pertinent inputs, i.e. motor operating criterion, are measured during operation of the motor 14. The various pertinent inputs are referred to herein as "Dynamicisms" and include, but are not limited to, such things as a closed loop dial, an open loop dial, an amount of current flowing through the motor 14 during operation, the voltage across the motor 14 during operation, an amount of torque provided by the motor 14, and a speed of the motor 14. For example, a first input 58a could be a closed loop dial signal, or a tachometer signal or any other dynamicism signal. Likewise, a second input 58b could be a motor speed signal, or an open loop dial signal or any other dynamicism signal. Dynamicisms include any motor operational value or parameter that has an effect on the calculation of the firing angle solution. As the dynamicisms change during operation, the firing angle solution for each subsequent half cycle, or other periodic interval based on half cycles, will also change.

To determine the firing angle solution for each half cycle, or multiple thereof, of the AC line during operation of the motor 14, the microprocessor 30 executes a universal generic firing angle control algorithm stored in a functionally non-volatile memory device 66 included in the microcontroller 26. For example, memory device 66 could be a read only memory (ROM) device, a Flash Memory device or a one time programmable (OTP) device. Alternatively, the memory device 66 could be included in the universal motor control module 10 external to the microcontroller 26. In one preferred embodiment, the generic firing angle algorithm is hard-coded in the memory device 66 during manufacturing of the universal motor control module 10. That is, the generic algorithm is stored in non-volatile memory device 66 as part of the process for manufacturing the universal motor control module 10 and can not be altered or modified once it is stored in the memory device 66. Thus, the generic algorithm is applicable to determine the firing angle solution for any of a plurality of motor applications in which any of a plurality of motors, such as motor 14, are controlled by the universal motor control module 10. More specifically, the generic algorithm determines the firing angle solution for any motor 14 in which the universal motor control module 10 is installed, such that the motor 14 operates according to parameters specifically required for the particular motor application.

The microprocessor 30 executes the generic algorithm utilizing the dynamicisms as inputs, thereby determining a firing angle solution specific to the particular motor 14 and the specific motor application. Generally, the generic algorithm can be expressed by the following equation:

Firing angle solution=$f$(dynamicisms)

For example, in one preferred embodiment, the generic algorithm could be more specifically expressed by the following equation.

Firing angle solution=$f(f$(switch position)+$(f$(dial setting 1)+$f$(dial setting 2)+$f$(current)+$f$(voltage)+$f$(tachometer)+ ... $f$(dynamicism $n$));

where 'switch position' refers to the position of the motor control switch 64, 'dial setting 1' refers to closed loop desired speed, 'dial setting 2' refers to open loop firing angle clamp, 'current' refers to the amount of current flowing through the motor 14, 'voltage' refers to a voltage value across the motor 14, and 'tachometer' refers to a rate of rotational speed of the motor. The motor control switch 64 controls the operational status of the motor 14. That is, if the motor control switch 64 is in an open position, the motor 14 is in an 'Off' operational status, while if the motor control switch 64 is in a closed position, the motor 14 is in an 'On' operational status.

The microcontroller 26 samples the dynamicisms using appropriate sensors or sensing circuits (not shown) for each dynamicism and utilizes the microprocessor 30 to execute the generic algorithm to determine the proper firing angle solution for the electronic valve 34 for each half cycle of the AC line voltage. Additionally, the generic algorithm utilizes at least one soft coded function coefficient stored in a non-volatile alterable memory device 68 to determine the firing solution such that the motor 14 functions in accordance with operational parameters specific to the particular application of the motor 14. Generally, the operational parameters of a given application will require the use of more than one function coefficient in the execution of the generic algorithm. Alterable memory device 68 can be any suitable memory device that allows data to be stored, read and altered such as flash memory, erasable programmable read-only memory (EPROM) or electrically erasable programmable read-only memory (EEPROM).

In one preferred embodiment, the function coefficient(s) are stored in the alterable memory device 68 subsequent to the manufacturing of the universal motor control module 10 and subsequent to the universal motor control module being implemented in a particular application. For example, if the universal control module 10 is utilized to control the motor 14 of a hammer drill, the function coefficient(s) specific to the operational parameters of the hammer drill are not stored in the alterable memory device 68 until after the hammer drill has been assembled including the universal motor control module 10. Thus, after the exemplary hammer drill is assembled including the universal motor control module 10, an external device (not shown) capable of communicating with the microcontroller 26 is used to program (i.e. store) the function coefficient(s) in the alterable memory device 68. The external device communicates the function coefficient (s) to the alterable memory device 68 over any suitable means for data transmission. For example, the function coefficient(s) can be transmitted from the external device to the alterable memory device 68 over the power cord of the hammer drill. The external device can be any computer-based device capable of transmitting data, such as a laptop computer, a hand-held computer or any other programming device. Alternatively, the module 10 could be programmed after its manufacture but immediately before being implemented in a particular application.

A further derivation of the generic algorithm incorporating the function coefficient(s) can be expressed by summing the products of the dynamicism(s) and associated function coefficient(s), as illustrated by the following equation.

Firing angle solution=*f*(switch position)*((dial setting 1*C1)+(dial setting 2*C2)+(current*C3)+ (voltage*C4)+(tachometer*C 5) . . . (dynamicism *n*Cn*));

where the value for 'switch position' equals one (1) if the motor control switch 64 is in a closed (i.e. 'On') position and zero (0) if the motor control switch 64 is in an open (i.e. 'Off') position. Additionally, C1, C2, C3, C4, C5. Cn are function coefficients specific to a particular application of the motor 14, so that the motor 14 operates in accordance with desired operational parameters of the particular application.

Thus, if a particular dynamicism is to have no impact on the firing angle solution for the electronic valve 34 in a given application, the function coefficient of that particular dynamicism would be zero (0). For example, if the universal motor control module 10 is implemented in an application where open loop control is desirable, C2, C3, C4 and C5, in the above generic algorithm, would be zero (0). However, if the universal motor control module 10 is implemented in an application where closed loop control is desirable, but there is no tachometer utilized in the application, then C1, C2, C3 and C4 would have values calculated to operate the motor 14 in accordance with desired operational parameters, and C5 would be zero (0).

Therefore, in one preferred embodiment, the microprocessor 30 executes the generic algorithm during each half cycle of the AC power source, implementing the function coefficient(s) stored in alterable memory device 68 as a constant value(s) in the algorithm, and utilizing the dynamicism(s) as an input variable(s) to determine the firing angle solution for the electronic valve 34, for each given half cycle. Alternatively, the microcontroller 26 could execute the generic algorithm based on multiples of the half cycle, as opposed to executing the generic algorithm during each half cycle. In this instance each firing angle solution calculated will be used to fire the electronic valve 34 for two or more consecutive half cycles. That is, although the electronic valve 34 will be fired during each half cycle based on the firing angle solution generated by execution of the generic algorithm, the generic algorithm will not be executed during each half cycle.

Since the dynamicism(s) is a variable, the calculated firing angle solution will change during operation of the motor 14 due to variations in load requirements for the motor 14 during operation and changes in function settings of the device in which the motor 14 is installed. For example, if the load requirement of the motor 14 changes during operation, the dynamicism for the current and/or the voltage being used by the motor 14 will change leading to a change in the firing angle solution to compensate for the change in power needed by the motor 14. Additionally, if a user changes the speed setting on a power drill, the associated dynamicism(s) will change, thereby altering the firing angle solution generated by the generic algorithm.

Although, in the various preferred embodiments described herein, the universal motor control module 10 has been described to execute the generic algorithm shown above, it should be appreciated that the particular algorithm described is exemplary only. As such the description of the exemplary algorithm does not exhaust all possible algorithms for use in implementing the universal motor control module 10, in accordance with the present invention. Accordingly, changes in the algorithm described above may be made by those skilled in the art without departing from the scope of the invention.

Figure 2:
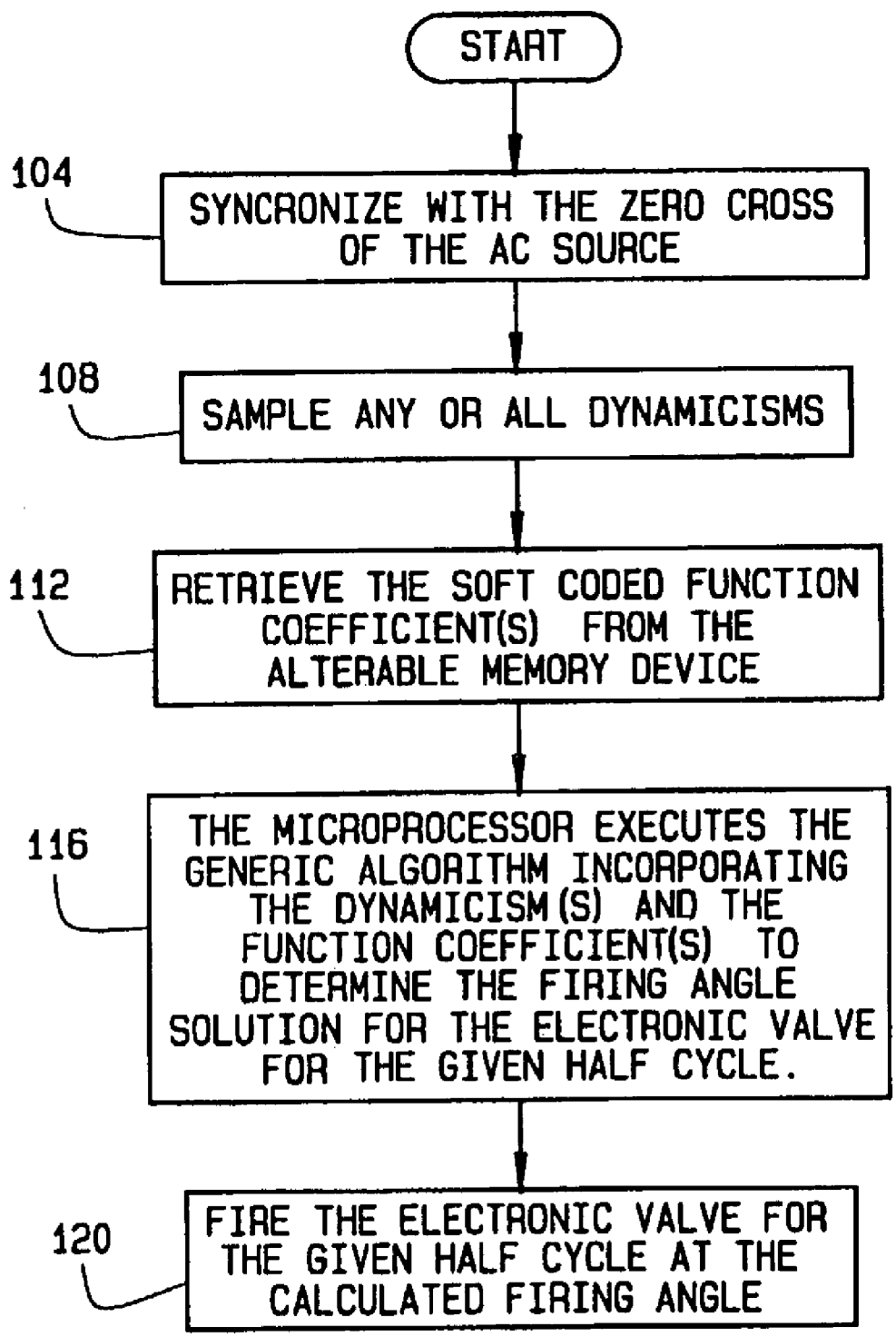
FIG. 2 is flow chart illustrating the general operation of the universal motor control module shown in FIG. 1.

FIG. 2 is flow chart 100 illustrating the general operation of the universal motor control module 10 (shown in FIG. 1), in accordance with one preferred embodiment of the present invention. In a practical application of the universal motor control module 10, on each given half cycle, or multiple thereof, the microcontroller 26 initially synchronizes with the zero cross of the AC voltage source to acquire a reference for firing of the electronic valve 34, as indicated at step 104. Next, the microcontroller 26 utilizes the microprocessor 30 to sample any one, or all, dynamicism(s), as indicated at step 108. The microprocessor 30 then retrieves the soft coded function coefficient(s) from the alterable memory device 68, as indicated at step 112. After retrieving the function coefficient(s), the microprocessor 30 executes the generic algorithm, incorporating the dynamicism(s) and the function coefficient(s), to determine the firing angle solution for the electronic valve for the given predetermined periodic interval, e.g. a half cycle, as indicated at step 116. The microprocessor 30 then fires the electronic valve 34 for the given periodic interval at the calculated firing angle, thereby operating the motor 14 in accordance with operational parameters of the specific application of the motor 14, as indicated at step 120.

Although the generic algorithm has been described above to be hard coded in memory device 66, in an alternate preferred embodiment, the generic algorithm is soft coded in an alterable memory device, such as memory device 68. Thus, in this embodiment, the generic algorithm can be programmed into the universal motor control module 10 subsequent to the manufacturing of the universal motor control module 10. Additionally, by storing the generic algorithm in an alterable memory device, the generic algorithm could be modified using an external programming device, any time it is desirable to do so.

Additionally, although various preferred embodiments described herein disclose a microcontroller implementation of the universal motor control module 10, it should be understood that the universal motor control module may also utilize other forms of digital circuitry. That is the control circuit 18 of the universal motor control module 10 can include any electrical and semiconductor devices suitable to sample the dynamicism(s) and execute the generic algorithm, as described above. For example, control circuit 18 could be a discrete digital logic integrated circuit, or an application specific integrated circuit (ASIC), or a combination thereof.

While the invention has been described in terms of various specific embodiments, those skilled in the art will recognize that the invention can be practiced with modification within the spirit and scope of the claims.

What is claimed is:

1. A method for tailoring the operation of any of a plurality of different motors adapted for use in a plurality of differing motor applications using a single motor control module, wherein each said motor application requires differing motor performance parameters, the method comprising:
    executing, at a predetermined periodic interval of an AC line signal, a universal control algorithm operating in connection with said motor control module to determine a firing angle solution for an electronic valve, the electronic valve configured to control a current through any of the different motors in any of the differing applications, said universal control algorithm comprising a plurality of variable inputs and a plurality of corresponding soft coded function coefficients specific to a particular motor application,
    wherein executing the universal control algorithm comprises:
        utilizing said variable, a plurality of motor operating criterion measurable during operation of the motor; and
        utilizing said corresponding coefficients to one of enable and disable each said variable input to determine said firing angle solutions for tailoring the performance of any of the different motors in accordance with performance parameters of the particular motor application; and
    firing the electronic valve during the periodic interval in accordance with the firing angle solution.

2. The method of claim 1, wherein the method further comprises firing the electronic valve at a modified firing angle solution when the motor control module is used with the motor in a different one of the plurality of motor applications to tailor the operation of the motor in accordance with operational parameters of the different motor application.

3. The method of claim 1, wherein sampling the motor operating criterion comprise acquiring a sensor reading for at least two of a trigger position, a closed loop dial, an open loop dial, a current flow through the motor, a voltage across the motor, and a motor speed.

4. A motor control module adapted to control any of a plurality of different motors adaptable for use in a plurality of differing motor applications requiring differing motor performance parameters, the motor control module comprising:
    a first memory device configured to store a hard coded universal control algorithm;
    a microprocessor configured to execute the universal control algorithm using as variable inputs of the universal control algorithm, a plurality of motor operation criterion measurable during operation of the motor, to determine a firing angle solution for an electronic valve during predetermined periodic intervals of an AC line signal, wherein the electronic valve controls the flow of current through a given one of the plurality of motors to control operation of the motor; and
    a second memory device configured to store a plurality of soft coded function coefficients specific to a particular one of the plurality of motor applications, wherein the function coefficients are used as constants of the control algorithm for one of enabling and disabling the variable inputs during execution of the control algorithm to tailor the firing angle solution to operate the motor in accordance with specific operational parameters of the particular motor application.

5. The motor control module of claim 4, wherein the firing angle solution is modified when the motor control module is used with the motor in a different one of the plurality of motor applications to tailor the operation of the motor in accordance with operational parameters of the different motor application.

6. The motor control module of claim 4, wherein the motor operating criterion are representative of pertinent motor inputs.

7. The motor control module of claim 6, wherein the motor operating criterion comprise sensor readings for at least two of a trigger position, a closed loop dial, an open loop dial, a current flow through the motor, a voltage across the motor, and a motor speed.

8. The motor control module of claim 4, wherein the motor control module is configured to enable initially storing the soft coded function coefficients in the second memory device subsequent to manufacturing of the motor control module.

9. The motor control module of claim 8, wherein the motor control module is further configured to enable alteration of the soft coded function coefficients in the second memory device subsequent to initially storing the soft coded function coefficients such that the operational parameters of the motor are alterable.

10. A power tool comprising:
    a universal control module configured to control an operation of any given one of a plurality of motors installed in any given one of a plurality of power tools, wherein the universal control module comprises:
    a microprocessor configured to:
    sample a plurality of motor operating criterion during operation of the motor; and
    execute a control algorithm, utilizing the operating criterion as variable inputs to the control algorithm, to determine a firing solution for an electronic valve at a predetermined periodic interval; and a memory device configured to store a plurality of soft coded function coefficients used as constants of the control algorithm to one of enable and disable the variable inputs during execution of the control algorithm, wherein the soft coded function coefficients are specific to operational parameters of the power tool.

11. The power tool of claim 10, further comprising a means for communicating data between the universal control module and an external device, such that the soft coded function coefficients can be initially stored in the memory device subsequent to manufacturing of the universal control module.

12. The power tool of claim 11, wherein the universal control module is further configured to communicate with the external device, via the means for communicating, to enable alteration of the soft coded function coefficients in the memory device subsequent to initially storing the soft coded function coefficients, such that the operational parameters of the motor are alterable.

13. The power tool of claim 11, wherein the means for communicating between the universal control module and the external device is a power cord for the power tool.

14. The power tool of claim 10, wherein the motor operating criterion comprises a sensor reading for at least two of a trigger position, a closed loop dial, an open loop dial, a current flow through the motor, a voltage across the motor, and a motor speed.

15. A method for controlling any of a plurality of motors in any of a plurality of motor applications using a universal control module, the method comprising:
electrically connecting any one of the motors to the universal control module, wherein the universal control module includes a processor;
storing a universal control algorithm in an electronic memory device included in the universal control module;
storing a plurality of function coefficients in an alterable electronic memory device included in the universal control module;
sampling a plurality of motor operating criterion during operation of the motor, the motor operating criterion being representative of pertinent motor inputs;
executing the control algorithm at a predetermined periodic interval using the function coefficients as constant values in the control algorithm and the motor operating criterion as variable input values in the control algorithm enabled or disabled by the constant values to determine a firing solution for an electronic valve for each periodic interval; and
firing the electronic valve during each periodic interval in accordance with the firing solution to tailor the operation of the motor to the particular motor application.

16. The method of claim 15, wherein storing a control algorithm comprises storing the control algorithm in the memory device during manufacturing of the universal control module.

17. The method of claim 16, wherein storing function coefficients comprises storing the function coefficients in the alterable memory device subsequent to the manufacturing of the universal control module.

18. The method of claim 15, wherein sampling the motor operating criterion comprises acquiring a sensor reading for at least two of a trigger position, a closed loop dial, an open loop dial, a current flow through the motor, a voltage across the motor, and a motor speed.

19. The method of claim 15, wherein storing the function coefficients comprise storing different function coefficients in the alterable memory device such that the different function coefficients are specific to a different one of the motor applications.

20. The method of claim 15, wherein storing the function coefficients comprise storing different function coefficients in the alterable memory device such that the operational parameters of the particular motor application are changed.

21. The method of claim 15, wherein storing the function coefficients comprise communicating the function coefficients from an external device to the universal control module alterable electronic memory device.

22. The method of claim 15, wherein the method further comprises firing the electronic valve using a modified firing solution when the universal control module is used with the motor in a different one of the plurality of motor applications to tailor the operation of the motor in accordance with operational parameters of the different motor application.

23. The method of claim 15, wherein the function coefficient is specific to a particular one of the motor applications.

24. A method for controlling the operation of any of a plurality of different motors adapted for use in a plurality of differing motor applications using a single motor control module, wherein each said motor application requires differing motor performance parameters, the method comprising:
executing a universal control algorithm, operating in connection with said motor control module said universal control algorithm comprising a plurality of variable inputs and a plurality of corresponding soft coded function coefficients specific to a particular motor operation.
wherein executing the universal control algorithm comprises:
utilizing as said variable inputs of, a plurality of motor operating criterion sampled measurable during operation of the motor; and
utilizing said corresponding coefficients to enable or disable each said variable input to determine a firing angle solution for tailoring the performance of any of the different motors in accordance with performance parameters of the particular motor application.

25. The method of claim 24, wherein the motor operating criterion comprise at least two of a trigger position, a closed loop dial, an open loop dial, a current flow through the motor, a voltage across the motor, and a motor speed.

26. The method of claim 24, wherein the method further comprises firing the electronic valve using a modified firing solution when the motor control module is used with the motor in a different one of the plurality of motor applications to tailor the operation of the motor in accordance with operational parameters of the different motor application.

27. A motor control module adapted to control any of a plurality of different motors adaptable for use in a plurality of differing motor applications requiring differing motor performance parameters, the motor control module comprising:
a programmable device configured to execute a universal control algorithm operable with any of the different motors in any of the different applications to determine a firing solution for an electronic valve during predetermined periodic intervals to control a current through any of the plurality of motors to control operation of the motor in any of the different applications; and
a memory device configured to store a plurality of soft coded function coefficients specific to a particular one of the plurality of motor applications, wherein the function coefficients are used as constants to one of enable or disable a plurality of monitored motor operating criterion used as variable inputs during execution of the control algorithm to tailor the firing solution to operate any of the motors in accordance with specific operational parameters of the particular motor application.

28. The motor control module of claim 27, wherein the firing solution is modified when the motor control module is used with the motor in a different one of the plurality of motor applications to tailor the operation of the motor in accordance with operational parameters of the different motor application.

29. The motor control module of claim 27, wherein the motor operating criterion comprises sensor readings for at least two of a trigger position, a closed loop dial, an open loop dial, a current flow through the motor, a voltage across the motor, and a motor speed.

30. The motor control module of claim 27, wherein the motor control module is configured to enable initially storing the soft coded function coefficients in the memory device subsequent to manufacturing of the motor control module.

31. The motor control module of claim 30, wherein the motor control module is further configured to enable alteration of the soft coded function coefficients in the memory device subsequent to initially storing the soft coded function coefficients such that the operational parameters of the motor are alterable.

32. A system for controlling a plurality of different power tools having different motors using a generic control module, said system comprising:

a first power tool including a first motor and a first control module programmed with a hard coded algorithm and executes the hard coded algorithm incorporating a plurality of soft coded coefficients specific to the first power tool and used as constants to enable or disable a plurality of operating criterion of the first motor used as variables during execution of the algorithm to control operation of the first motor in accordance with desired operational parameters of the first power tool; and a second power tool including a second motor and a second control module identical to the first control module and programmed with the hard coded algorithm, the second control module executes the hard coded algorithm incorporating a plurality of soft coded coefficients specific to the second power tool and used as constants to enable or disable a plurality of motor operating criterion of the second motor used as variables during execution of the algorithm to control operation of the second motor in accordance with desired operational parameters of the second power tool.

* * * * *